(12) United States Patent
Halperin et al.

(10) Patent No.: US 6,226,619 B1
(45) Date of Patent: May 1, 2001

(54) METHOD AND SYSTEM FOR PREVENTING COUNTERFEITING OF HIGH PRICE WHOLESALE AND RETAIL ITEMS

(75) Inventors: Arnold Halperin, Cortlandt Manor; Paul Andrew Moskowitz, Yorktown Heights; Alejandro Gabriel Schrott, New York; Charles P. Tresser, Mamaroneck; Robert Jacob von Gutfeld, New York, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/182,269

(22) Filed: Oct. 29, 1998

(51) Int. Cl.$^7$ .................................................. G06F 17/60
(52) U.S. Cl. ................................................ 705/1; 705/23
(58) Field of Search ..................... 235/380, 383; 340/825.34; 705/1, 23; 283/72, 74, 79, 81, 82, 83, 85

(56) References Cited

U.S. PATENT DOCUMENTS

| | | | |
|---|---|---|---|
| 4,630,845 | * 12/1986 | Sanner | 340/825.34 |
| 4,686,515 | * 8/1987 | Anderson et al. | 340/825.34 |
| 4,816,824 | * 3/1989 | Katz et al. | 340/825.34 |
| 5,160,171 | * 11/1992 | Gregory et al. | 283/91 |
| 5,360,628 | * 11/1994 | Butland | 427/7 |
| 5,442,433 | * 8/1995 | Hoshino et al. | 356/71 |
| 5,583,631 | * 12/1996 | Lazzerini | 356/71 |
| 5,635,693 | 6/1997 | Benson et al. . | |
| 5,708,419 | * 1/1998 | Isaacson et al. | 340/825.34 |
| 5,729,697 | * 3/1998 | Schkolnick et al. | 235/383 |
| 5,762,377 | * 6/1998 | Chamberlain | 283/67 |
| 5,818,021 | * 10/1998 | Szewczykowski | 235/380 |
| 5,873,604 | * 2/1999 | Phillips | 283/70 |
| 5,895,073 | * 4/1999 | Moore | 283/70 |
| 5,917,925 | * 6/1999 | Moore | 382/101 |
| 5,979,941 | * 11/1999 | Mosher, Jr. et al. | 283/67 |

FOREIGN PATENT DOCUMENTS

| | | | |
|---|---|---|---|
| WO 98/02847 | * 1/1998 | (WO) | G06K/17/00 |
| WO 98/55970 | * 12/1998 | (WO) | G07F/7/12 |

OTHER PUBLICATIONS

Hook, C., Automatic I.D. News Europe, Jan./Feb. 1997, vol. 6 Issue 1, p25, 3p.*
Hook, C., Automatic I.D. News Europe, Sep. 1997, vol. 6, Issue 7, p28, 4p.*
Conrad, A., Apparel Industry, Sep. 1996, vol. 57 Issue 9, p22, 5p.*

* cited by examiner

Primary Examiner—James P. Trammell
Assistant Examiner—Chang Y. Chung
(74) Attorney, Agent, or Firm—McGinn & Gibb, P.C.; Stephen C. Kaufman, Esq.

(57) ABSTRACT

A method and system for preventing counterfeiting of an item, include an interrogatable tag attached to the item. The item includes visible indicia for comparison with secret, non-duplicable information stored in the tag designating authenticity.

33 Claims, 2 Drawing Sheets

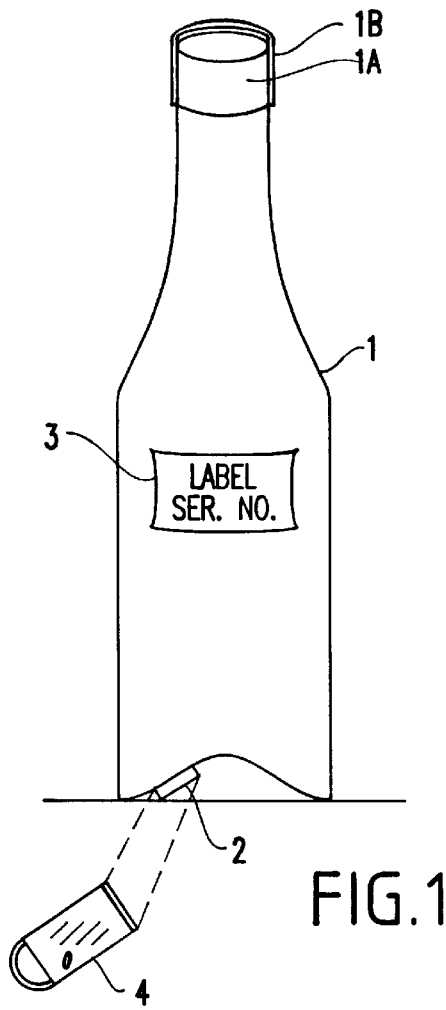
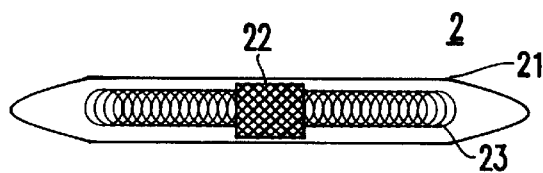
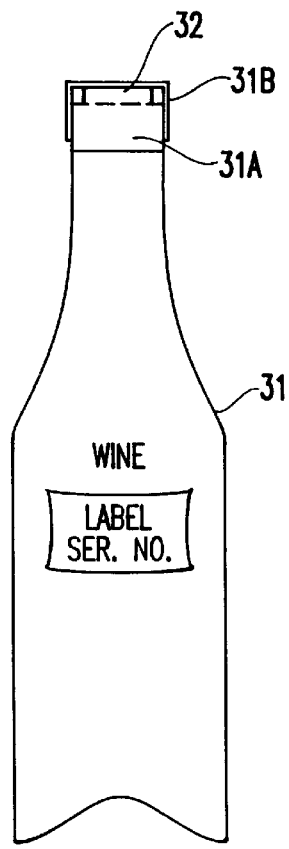
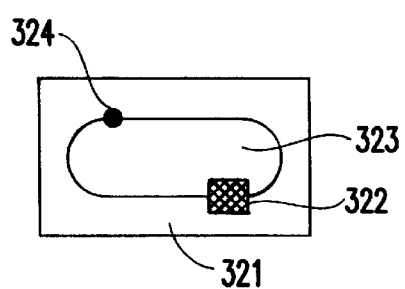
FIG.1
FIG.2
FIG.3
FIG.4

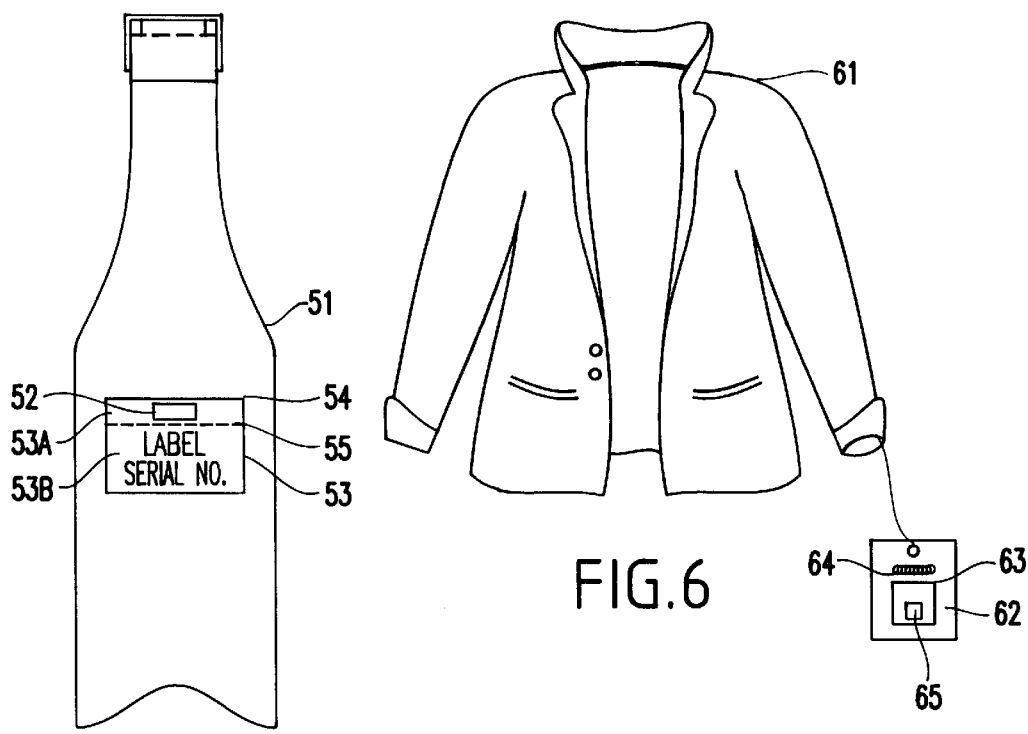
FIG. 5
FIG. 6
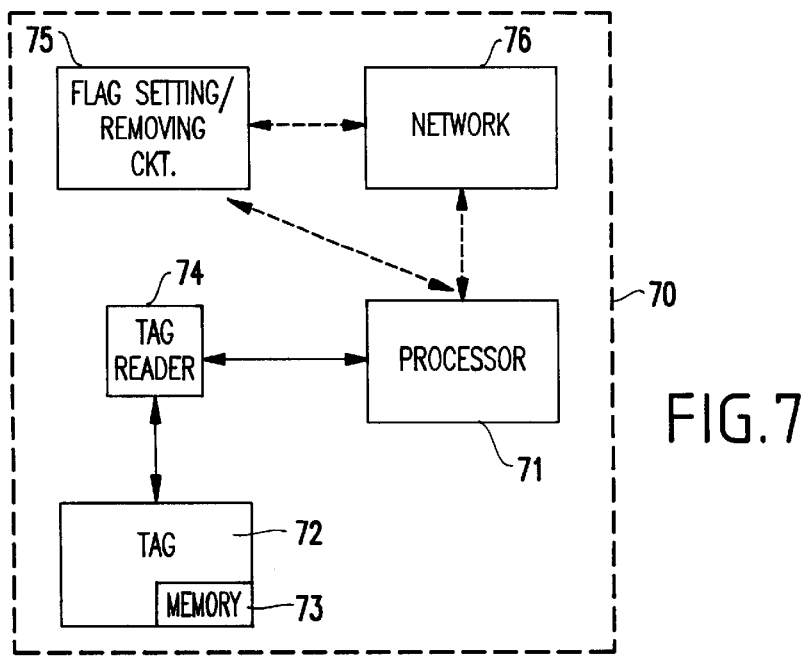
FIG. 7

METHOD AND SYSTEM FOR PREVENTING COUNTERFEITING OF HIGH PRICE WHOLESALE AND RETAIL ITEMS

This application is related to application Ser. No. 09/182,279 filed on Oct. 29, 1998 by A. Afzali-Ardakani et al entitled "Method and System for Preventing Parallel Marketing of Wholesale and Retail Items"; and to application Ser. No. 09/182,280 filed on Oct. 28, 1998 by D. Coppersmith et al entitled "System for Protection of Goods Against Counterfeiting"; which related Applications are being filed contemporaneously with this application. The entire disclosure of each of these applications is incorporated by reference herein. Each of these three applications is copending and commonly assigned.

BACKGROUND OF THE INVENTION

1. Field of the Invention

The present invention generally relates to a method and system for preventing counterfeiting of expensive items, and more particularly to a method and system for preventing counterfeiting of high value items without the need for a large, central database for verification of authenticity of such items at the point of sale. The present invention also suggests methods and techniques for preventing "parallel markets".

2. Description of the Related Art

Conventional methods and apparatus exist for making it difficult to counterfeit high value items. Such items may include, for example, rare wines and spirits, fur coats, expensive jackets, perfumes, etc. Such items are generally sold in stores or restaurants with well-known reputations for quality and service.

Nevertheless, some retailers may participate in and actually be members of organizations which sell counterfeit products as genuine products. Accordingly, methods for combating the counterfeiter must be considered. Additionally, "parallel" markets are markets where goods may be diverted from a legitimate vendor (i.e., those who have contracts with the producer or authorized distribution channels). Sales from those having no contracts with the producer or authorized distributors are also sales which the present invention attempts to prevent.

However, a basic concept to assure that the item is genuine requires a form of verification of the item, such as IDs to confirm the item as being genuine.

Several such tagging mechanisms have already been proposed previously. However, such tagging mechanisms fail to engender (or strongly encourage) the customer's participation in helping to recognize counterfeited items. It is easy to produce seals only verifiable by the vendor, but the cooperation of the public in fighting counterfeiting cannot be gained easily by using such devices.

To partially overcome this difficulty, several manufacturers attach a serial number to each item.

For serial numbers to offer increased protection, some conventional methods use a serial number where part or all of the digits are chosen at random or generated by some secret code, in which the originator keeps a copy of all numbers so generated and the authenticity is checked by verifying that the tag of a given item carries a number in the list (e.g., a simple comparator function).

However, such methods suffer from several drawbacks. For example, from one of these methods contact is required with the originator. Communications used for verification make the present verification process inefficient, and not always reliable.

Further, the vendor must maintain a database which may constitute a large privacy invasion such that customers may be reluctant to participate in the verification processes. For example, if the customer uses a credit card (or possibly some form of bank debit card), it is easy to associate his/her name to the product which has been bought, often without the consent of the customer.

Additionally, the originator must maintain an ever-growing database, and must make this database secure for an unforeseen time period. For example, every access to/reading from the database must be absolutely trustworthy, and one has to ensure that no external party obtains access to the database (e.g., either by a retail employee or by an external computer "hacker" accessing the database by modem or the like), which is more difficult for a database one often accesses.

Additionally, using a small scanner, and/or the help of several accomplices, the counterfeiter may copy huge lists of existing serial numbers if the serial numbers are visible when the product is packaged, and the public has no means of even partially checking originality before buying otherwise.

Thus, the conventional methods have many problems and do not affirmatively enlist the aid of the purchaser in fighting counterfeiting of high value goods. Further, none of the aforementioned methods addresses reliable means for deterring parallel markets.

SUMMARY OF THE INVENTION

In view of the foregoing and other problems of the conventional methods and structures, an object of the present invention is to provide a method and structure in which the counterfeiting of high value items is discouraged and in which customer assistance in the verification process is obtained.

Another object of the present invention is to provide a structure in which authenticity can be easily verified without having to maintain large databases and provide for their security.

Yet another object is to provide a method and structure of preventing counterfeiting without the customer perceiving a large invasion of the customer's privacy.

Yet another object is to provide a system in which the counterfeiter is prevented from obtaining huge lists of existing serial numbers in a form that can be useful for producing counterfeit items.

In a first aspect of the present invention, a system for preventing counterfeiting of an item, is provided which includes an interrogatable tag attached to the item, wherein the item includes indicia visible by a purchaser of the item, for comparison with a secret, non-duplicable number stored in the tag designating authenticity.

In a second aspect of the present invention, a counterfeit indicator for attachment to a retail item includes an interrogatable tag attached to the item, wherein the item includes indicia visible by a purchaser of the item, for comparison with a secret, non-duplicable information held in the tag.

In a third aspect of the present invention, a counterfeit indicator for attachment to a retail item includes an item tag attached to the item and including a cover label with predetermined indicia thereon, and an interrogatable tag obscured by the cover label, wherein the tag is disabled after interrogation of the tag is performed. Thus, for example, the tag can be written to at the point of sale, in a manner such that any prior sale data from a possible earlier sale and/or return is "locked" (e.g., cannot be erased or written over).

In a fourth aspect of the present invention, a method for preventing counterfeiting of an item, includes: attaching an interrogatable tag to the item, the tag storing therein secret, non-duplicable information; providing, in advance, the item with visible indicia; and comparing the visible indicia with the secret, non-duplicable information stored in the tag designating authenticity.

Moreover, the customer can participate by verifing that different items on shelves have different serial numbers. The customer also can check that the serial number and the coded number in the tag are compatible using some public key, obtainable, for example, over the Internet. The customer can also send back to the producer the pair including the serial number and the secret number.

With the unique and unobvious aspects of the present invention, customer participation is provided to combat counterfeiters, offering reliable counterfeiting detection and prevention.

Further, with the invention, a central database is unnecessary at least for item verification purposes, and the invention protects against unscrupulous merchants, as well as provides a contact-free scanning operation.

BRIEF DESCRIPTION OF THE DRAWINGS

The foregoing and other purposes, aspects and advantages will be better understood from the following detailed description of preferred embodiments of the invention with reference to the drawings, in which:

FIG. 1 illustrates an exemplary high value item (e.g., a bottle of rare wine) for use according to a first embodiment of the present invention having an identification tag and for use with a tag reader;

FIG. 2 illustrates magnified details of the identification tag for being attached to the item of FIG. 1;

FIG. 3 illustrates an exemplary high value item (e.g., a bottle of rare wine) for use according to a second embodiment of the present invention having an identification tag and for use with a tag reader;

FIG. 4 illustrates a magnified detail of the tag for being attached to the item of FIG. 3;

FIG. 5 illustrates a third embodiment of a tag being attached to an item (bottle);

FIG. 6 illustrates another exemplary high value item (e.g., an article of clothing) for use with the present invention; and FIG. 7 illustrates a system for preventing counterfeiting high value items according to the present invention.

DETAILED DESCRIPTION OF PREFERRED EMBODIMENTS OF THE INVENTION

Referring now to the drawings, and more particularly to FIGS. 1–7, there are shown preferred embodiments of the method and structures according to the present invention.

Generally, in the present invention, a tag is employed according to the general principles disclosed in U.S. patent application Ser. No. 09/060,026, entitled "SYSTEM FOR PROTECTION OF GOODS AGAINST COUNTERFEITING" by Don Coppersmith et al., commonly assigned with the present application and incorporated herein by reference in its entirety. In accordance with the above-referenced U.S. patent application, the present invention associates a serial number, visible by the customer, to a secret, non-duplicable number.

Moreover, the present invention discloses carrying the secret non-duplicable number in a non-duplicable tag which, if desired, can be read without contact (e.g., a contact-free manner).

If the product is naturally delivered in a container, then the tag can be attached to the container. Moreover, a non-detachable tag may be used which is deactivated or destroyed after the first product use, so that the container cannot be refilled with a counterfeit product by a counterfeiter who would recover a used container from trash or the like.

For the present invention, a tag is used that is preferably unique (e.g., one of a kind) in terms of its permanently "burned-in" information. Such a tag and procedure for burning-in the tag is well known and described in the art of fusible links. Thus, each tag attached to an item will have a different code (e.g., a unique number or set of alphanumerics) that cannot be duplicated by a counterfeiter, absent the counterfeiter having a factory that makes chips, etc.

The present invention assumes that the level of counterfeiting will be of a lesser sophistication where the potential counterfeiter does not have the wherewithal to build a complete new set of chips and radio frequency identification (RFID) tags. Simultaneously, when an item are sold by a legitimate merchant, the item is scanned (e.g., in a non-contact manner) to obtain the information on the tag (e.g., the tag being possibly encrypted).

Depending on the capacity of the memory, certain data (e.g., a date, the routing information, or any other desirable relevant information) also may be included. While it remains simple to read this tag, it becomes impossible to change the information as it is "locked" (e.g., fixed) in the memory.

Simultaneously, it is crucial that the tag cannot be duplicated and that the scanning machine also includes a decryption mechanism which will allow the customer to verify at the point of sale that the encrypted number carried by the tag corresponds to the unique serial number recognizably marked on the product and/or its container. The encryption can be made using either public or private cryptography. Such cryptography and methods sufficient for the implementation of this invention are well-known in the art as disclosed, for example, in "Handbook of Applied Cryptography," by Alfred J. Menezes, Paul C. van Oorschot and Scott A. Vanstone, CRC Press, 1997.

Alternatively, the coded information could be sent by a network such as a world-wide network (e.g., the World-Wide-Web/Internet) or any other communication means to some central database in a protected manner, such as public and private keys. However, this is inconvenient, and not always reliable.

In one implementation, the tag reader also would modify or write to the tag to mark that the article has been sold. This modification is preferably locked in the memory. Accordingly, memory space may be used for indicating whether the item has been legitimately returned for resale at a later time. Alternatively, the tag can be effectively destroyed by the merchant during completion of the sale (e.g., a single-use tag).

It should be noted that encryption is not essential if it is certain that the tags cannot be duplicated. However, encryption of the tags represents a preferred embodiment.

First Embodiment

Turning to FIGS. 1 and 7, as an example of an anti-counterfeiting system according to the present invention, an expensive wine (e.g., Dom Perignon '55 Brut, etc.) will be considered where the cost is such that it is essential that the bottles not be refilled and reused with counterfeit wine for resale.

First, prior to turning to exemplary applications, a system 70 for preventing counterfeiting of high value items will be generally described referring to the block diagram of FIG. 7.

As shown, the system 70 includes a processor 71, a tag 72 for being affixed to a high value item including a memory 73 for storing information related to the item to which the tag 72 is affixed, and a tag reader 74 (e.g., preferably a contact-free reader) for interrogating the tag 72. While the tag reader is shown separately from the processor 71, the tag reader could include the processor built therein.

Optionally, the processor may be connected to a remote flag setting/removing circuit 75 which can be set by the processor 71 upon the tag being interrogated at a time of first sale, first use, or the like. The flag setting/removing circuit 75 could be located at the manufacturer.

Further, the processor 71 can optionally be connected to a telephone communication system and/or world-wide network such as the World-Wide-Web/Internet 71 as a remote mechanism for verifying predetermined indicia with information held, for example, by the manufacturer. Thus, communication/verification from the manufacturer could be performed either through Internet 76 or directly through a telephone line and modem.

Turning to an exemplary and non-limiting application as shown in FIG. 1, a small tag 2 (e.g., manufactured by and commercially available, for example, from Trovan Electronic Identification Systems, Inc. and presently used for animal ID) may be employed, which is cylindrical in shape, about 2 mm in diameter, and about 11 mm in length. The tag is preferably a radio frequency identification tag 2 (e.g., shown in greater detail in FIG. 2). Obviously, other tags having different dimensions could be used.

As shown in FIG. 2, the tag 2 includes a circuit chip 22 and coil antenna 23 or the like for receiving an interrogation signal, with the chip 22 and antenna 23 being housed in a glass container 21.

The circuit chip 22 presently contains unique "read only" information. However, this chip can be replaced by a chip that contains a memory space that can be "written" in a secure manner.

The tag can be partially concealed by securely housing the tag in the glass housing/container 21 (e.g., shown in FIG. 2), and attaching the tag 2 onto the outer surface of the concave bottom surface of the bottle 1.

Preferably, the tag 2 is unobtrusive to avoid affecting the appearance and aesthetic appeal of the bottle 1. As is customary, the bottle 1 includes a cork (e.g., stopper) 1A and a cap member (e.g., seal) 1B typically formed of foil or the like and covering the cork 1A. A vintner's label 3 may include a unique serial number thereon. Any attempt to remove the tag preferably causes the tag to be destroyed. For example, the glass envelope may be destroyed by tearing at least one of the crucial circuit lines on the chip (or the lines leading to an antenna, as described below).

At the time of a sale, the tag is interrogated (e.g., read) by a hand-held tag reader 4 (e.g., as shown in FIG. 1) or the like. The tag reader 4 preferably includes, or is attached to, a computing device to provide decryption, for example, using a public key. For example, the verification operation may include simply verifying (through a comparator function) the number read from the tag with the number on the serial number on the label. The tag reader 4 may further write to the tag to indicate "sold" or alternatively may destroy the tag by producing, for example, a predetermined, large RF field after reading by burning out a portion of the tag's memory or the antenna.

Thus, such an item will no longer be salable by a reputable merchant since it will no longer be verifiable by scanning. Of course, a bar code label also may be provided with encrypted information relating to the bottle's (e.g., the item's) content, and masked so that the customer can only access it after buying the product, and then recheck the originality of the product using a personal computer in the case of public encryption. This label could serve as possible corroboration or backup in case the glass-encased tag 2 is inadvertently broken.

Thus, with the first embodiment of the present invention, customer participation is provided to combat against counterfeiters, and reliable counterfeiting detection and prevention in a contact-free scanning environment results. Further, no central database is necessary in this embodiment.

Second Embodiment

As shown in FIGS. 3–5, an alternative method for preventing counterfeiting and achieving security for an item 31 (e.g., a bottle of rare wine) is to have a small flat tag 32, typically, though not necessarily, operating around 125 kHz that can be hidden between the cork 31A and the sealing cap 31B of the bottle. This tag 32 also can have the same chip design as described above. Such a tag is again unique in its code and cannot be duplicated readily.

Once the bottle is opened conventionally (e.g., the top covering seal 31B, typically made of foil or the like, of the bottle is removed), the tag is destroyed as it is exposed (e.g., to the ambient, to light, etc. depending upon the design and characteristics of the tag 32) or attached to the cover and the cork in a manner that causes the tag's chip circuit lines or one of the antenna lines to be severed.

For example, as shown in FIG. 4 which illustrates the magnified front details of the tag 32, the tag 32 includes a substrate 321 for mounting the tag, a circuit chip 322, an antenna 323, and an attachment point 324 of the seal 31B to the antenna 323.

For example, when the seal 31B is lifted, the antenna 323 is ripped. Alternatively, the seal 31B could be attached to wiring on the circuit chip 322 such that when the seal 31B is lifted the wiring on the chip would be torn, thereby destroying the device.

Third Embodiment

FIG. 5 illustrates a third embodiment of the present invention in which a high-priced item 51 includes a tag 52 (e.g., similar to either of the ones illustrated in FIG. 2 or FIG. 4) which is concealed and attached to the underside of a vintner's label 53. The label includes first and second portions 53A, 53B (e.g., top and bottom), and the tag is attached to one of the portions (e.g., top portion) of the label. The label 53 preferably includes the serial number, as well as a tab 54 fixed to the portion of the label having the tag attached thereto. The tab 54 is for being grasped and pulled by a merchant upon sale of the item.

Additionally, the label 53 includes a perforation 55, separating the first and second portions 53A, 53B, respectively, of the label, for allowing the first and second portions to separate when the user (merchant) grasps and pulls on the tab, thereby to detach the label portion including the tag (e.g., the top portion of the label) from the non-tag carrying second portion of the label.

In operation of the third embodiment of the present invention, the merchant may rip off a portion (e.g., a top portion 53A) of the label after reading the tag with, for example, the hand-held tag reader discussed above, and removes the top portion 53A with the tag attached thereto.

Clearly, these concepts can be extended to many items other than wine, such as for example, jackets, handbags etc. where the same type of tags can be concealed and either be left intact, modified, or removed after sale.

Along these lines, another embodiment is shown in FIG. 6, in which an article of clothing 61 which includes an item tag 62 attached thereto by a fastening means (e.g., cord, string, plastic, etc.). The item tag 62 includes a cover label 63 with certain indicia regarding the product/item, price, etc. and includes a serial number 64 on the item tag. A readable tag 65 (e.g., as described above and shown in any of FIGS. 2 or 4–5) is provided preferably underneath the cover label 63.

In operation, at the time of sale, the readable tag 65 may be removed after reading of the tag is performed and preferably compared to the indicia on the item label.

Thus, with the unique and unobvious aspects, features, and advantages of the present invention, a unique "signature" is provided by a tag, which may be complemented by a bar-code and which is read upon the sale of the item and one that will not withstand tampering.

There are many methods of making the tags such that they are destroyed at will (e.g., at the point of sale). For example, part of the tag can be attached to the top of the wine bottle cork wrapper (e.g., as shown in FIG. 3) so that when the wrapper is removed, the antenna or a crucial portion of the circuit chip wiring is broken or a crucial part of the chip is disabled.

Another method includes providing the tag as a small part of the wine label which can be removed upon sale of the bottle. Specifically, upon a sale, the merchant can destroy (e.g., crush) the tag.

Yet another way is to provide sufficient RF power in the read/write base station tool so that at the discretion of the merchant, at least part of the tag circuit will "burn-out", thereby making the tag inoperable.

A major factor to ensure that counterfeiting has not occurred involves issuance of a receipt with the serial number and the encrypted serial number to be sent by the customer to the manufacturer, similar to a warranty registration, using encryption/decryption techniques such as, for example, by use of public and private keys. This allows the manufacturer to verify the authenticity of the label by using the key(s). If the product is counterfeit, it will provide a mechanism for finding the merchant involved in counterfeiting.

Alternatively, the two numbers can be entered at the point of sale on the Internet to the web site of the merchant to verify the two numbers and prevent re-use of the two numbers. In case the item is returned, the merchant sends a message to the web site allowing the numbers to be re-used.

Thus, the present invention allows customer participation in combating counterfeiting, thereby maintaining product goodwill and integrity, and further provides very hard counterfeit detection of the protection mechanism.

Additionally, the invention renders a central database to be unessential, requiring only a simple log kept by the manufacturer. Also, the invention protects against counterfeit sales, and allows contact-free scanning/reading.

While the invention has been described in terms of several preferred embodiments, those skilled in the art will recognize that the invention can be practiced with modification within the spirit and scope of the appended claims.

For example, while the present invention has been described for potential use with expensive and/or rare wine, other items would find great benefit from the invention including electronics, clothing, software, etc., which will help maintain a familiar or trademarked product's goodwill and maintain product integrity and customer confidence in the product.

Further, in a modification of the above embodiments, in a further attempt to obtain the customer's compliance and assistance in actively combating counterfeiting and so-called "parallel markets", the RFID tag's routing information may be tied to the authenticity seal of the item. Thus, if the routing information is erased, when the seal is broken or tampered with, a customer is unlikely to purchase such an item, knowing that the item is likely a counterfeit product. Alternatively, the routing information could simply be retained, thereby showing the location, identity, or other criteria of the unscrupulous counterfeiter.

In yet another modification, the number corresponding to the item may be provided and the warranty may be checked with such a number. Along these lines, the warranty information could be destroyed upon first sale of the item, and hence any warranty information would be impossible to obtain if the product was refilled/refurbished to look like an original but the warranty information was missing/inaccessible. Thus, most prudent customers would be forced to verify authenticity should they wish to obtain/activate the warranty associated with the item. As discussed further below, this feature would be especially advantageous depending upon what type of good the item represents.

Additionally, along with a mechanism provided for verifying the first information (e.g,. a unique item number) with second information (e.g., a warranty number), as mentioned above, a flag setting/removing circuit 75, situated at a manufacturer of the item, could be provided for setting a flag corresponding to the first and second numbers so that an attempt to re-verify the first and second numbers again is refused.

Such a flag could be used with both durable (e.g., non-consumable) or non-durable (consumable) goods. However, the flag would likely be most beneficial with consumable goods (e.g., wine, perfume, etc.) as opposed to non-consumable goods (e.g., fur coats, electronics, software, etc.)

Specifically, with a consumable good, the flag setting circuit could be set so that once the consumable good was sold, and thus any warranty, seal of authenticity, or the like associated therewith would be nullified.

In contrast, with a durable, non-consumable good, the seal of authenticity would still be desirable, even after the first sale. Thus, if a customer purchased a genuine Gucci® handbag, then the seal of authenticity would remain (and the warranty would be retained), to indicate that the handbag is a genuine article. This would allow warranties and the like to be freely transferrable with the genuine article from a first purchaser to a second subsequent purchaser.

Thus, the circuit 75 and technique for setting the flag could be modified such that the flag is removable/nonremovable depending upon the type and/or class of goods. Further, this would allow the flag to be removed when the item is returned to one of a point of sale and the manufacturer of the item, such that the first and second numbers can be verified at a next sale. Hence, for expensive durable goods, encryption/decryption (e.g., using public/private keys) would allow the flag at the remote manufacturer to be reset accordingly.

What is claimed is:

1. A system for preventing counterfeiting of an item, comprising:
   an interrogatable radio frequency identification (RFID) tag attached to the item for being interrogated,
   wherein said item includes visible indicia for comparison with secret, non-duplicable information stored in said tag designating authenticity, and said item includes a label, and
   wherein said tag is concealed from a user and is attached to a side of said label opposite said user when viewing said label, said label including first and second portions and the tag being attached to one of said first and second portions.

2. The system according to claim 1, wherein said indicia comprises at least one of a serial number and alpha-numeric characters, and
wherein said tag comprises a single-use tag such that said tag is nullified after said tag has been read.

3. The system according to claim 1, wherein said tag is unique and non-duplicatable, said system further comprising a tag reader for reading said tag without contact therewith.

4. The system according to claim 1, wherein said item is stored in a container, and said tag is attached to the container.

5. The system according to claim 1, wherein said tag comprises a non-detachable tag which becomes deactivated after the item's first use, such that the item is non-replenishable and non-refurbishable with a counterfeit product.

6. The system according to claim 5, wherein information on said tag remains on said tag after said tag has become deactivated.

7. The system according to claim 1, wherein said tag comprises a non-detachable tag which becomes deactivated after the item's sale, such that the item is non-replenishable and non-refurbishable with a counterfeit product.

8. The system according to claim 1, wherein said tag comprises a unique tag having unique permanent information code, such that each tag attached to an item has a different information code.

9. The system according to claim 1, wherein said tag includes predetermined data fixed therein including at least one of a date, routing information, a product data, and warranty data.

10. The system according to claim 1, wherein one of the item and a container for the item includes a visible unique code marked thereon,
said system further comprising a tag reader for reading said tag, said tag reader including a decryption mechanism therein for allowing a customer to verify at a point of sale that an encrypted code carried by said tag corresponds to the unique code marked on said one of the item and said container.

11. The system according to claim 1, further comprising a tag reader for reading said tag,
wherein the tag reader invalidates the tag to mark the article as sold after a sale has been completed, and said tag comprises a single-use tag.

12. The system according to claim 1, further comprising a tag reader for interrogating said tag,
wherein said tag includes a memory containing one of a unique read-only information and a memory which is alterable in a secure manner, and a housing,
said housing of said tag at least partially concealing the tag to a user, said tag further comprising a receiver receiving an interrogation signal from said tag reader, said memory and said receiver being housed in said housing,
said system further comprising means for erasing said tag information when said tag is removed from said item.

13. The system according to claim 1, further comprising a tag reader including a decryption device,
wherein after reading, said tag reader performs one of writing to said tag to indicate a status of said item and produces a predetermined radio frequency field for destroying the tag after reading.

14. The system according to claim 1, wherein said item includes a stopper for closing said item and a sealing cap over said stopper, wherein said tag comprises a flat tag and is sandwiched between said stopper and the sealing cap, and
wherein, to open said item, the sealing cap and the stopper are removed in turn, and upon removing said sealing cap, the tag is rendered inoperable as it is exposed.

15. The system according to claim 14, wherein said tag includes a circuit chip and an antenna, and said sealing cap is coupled to one of a line of said circuit chip and said antenna,
wherein when said sealing cap is lifted, said one of said circuit chip and said antenna are rendered inoperable.

16. The system according to claim 1, wherein said item includes a stopper for closing said item and a sealing cap over said stopper,
wherein said tag comprises a flat tag attached to the sealing cap and said stopper such that the tag is severed when said item is opened.

17. The system according to claim 1, wherein said label includes indicia and a tab fixed to said one of said first and second portions having the tag attached thereto, said tab being removed upon sale of the item, and
wherein the label further includes a perforation separating the first and second portions of the label, and enabling the user to detach said one of said first and second portions including the tag from the other of said first and second portions.

18. The system according to claim 1, further comprising a tag reader, wherein said item includes an item tag attached thereto, and
wherein said tag is disabled after said tag is read by said tag reader.

19. The system according to claim 1, further comprising a seal for at least partially sealing said item and substantially all of said tag,
wherein said RFID tag includes routing information validating authenticity of said item.

20. The system according to claim 1, wherein said tag warranty information associated therewith and indicia corresponding to said warranty information.

21. The system according to claim 20, wherein indicia corresponding to the item is provided to a purchaser of said item and said warranty information is verifiable only with said indicia, such that said indicia is nullified upon a sale of said item.

22. The system according to claim 20, wherein indicia corresponding to the item is provided to a purchaser of said item and said warranty information is verifiable only with said indicia, such that said indicia is nullified upon a use of said item.

23. A counterfeit indicator for attachment to a retail item, including:
an interrogatable radio frequency identification (RFID) tag attached to the item,
wherein said item includes indicia visible by a purchaser of the item, for comparison with a secret non-duplicable information held in said tag, and said item includes a label, and
wherein said tag is concealed from a user and is attached to a side of said label opposite said user when viewing said label, said label including first and second portions and the tag being attached to one of said first and second portion.

24. The counterfeit indicator according to claim 23, further comprising:
wherein said label includes indicia and a tab fixed to said one of said first and second portions having the tag attached thereto, said tab being removed upon sale of the item.

25. The counterfeit indicator according to claim 24, wherein the label further includes a perforation separating the first and second portions of the label, and enabling the user to detach said one of said first and second portions including the tag from the other of said first and second portions.

26. A counterfeit indicator for attachment to a retail item, including:
- an item tag attached to the item and including a cover label with predetermined indicia thereon; and
- an interrogatable radio frequency identification (RFID) tag obscured by said cover label,
- wherein said tag is disabled after interrogation of said tag is performed, and
- wherein said tag is attached to a side of said label opposite said user when viewing said label, said label including first and second portions and the tag being attached to one of said fist and second portions.

27. The counterfeit indicator according to claim 26, further comprising a seal for at least partially sealing said item and substantially all of said tag,
- wherein said tag includes routing information for validating the authenticity of the item.

28. The counterfeit indicator according to claim 26, further comprising a remote mechanism for verifying said predetermined indicia with second information at a manufacturer of said item.

29. The counterfeit indicator according to claim 28, wherein said remote mechanism comprises one of the Internet and a telephone system, and
- wherein said predetermined indicia and said second information comprise first and second numbers, respectively.

30. The counterfeit indicator according to claim 26, wherein said predetermined indicia comprises a first number, said indicator further comprising:
- means for verifing said first number with a second number; and
- means, situated at a manufacturer of said item, for setting a flag corresponding to the first and second numbers so that an attempt to re-verify the first and second numbers again is refused.

31. The counterfeit indicator according to claim 30, further comprising:
- means for removing the flag when the item is returned to one of a point of sale and the manufacturer of the item, such that the first and second numbers can be verified at a next sale.

32. The system according to claim 26, wherein information on said tag remains on said tag after said tag has become disabled.

33. A method for preventing counterfeiting of an item, comprising:
- attaching an interrogatable radio frequency identification (RFID) tag to the item, said tag storing therein secret, non-duplicable information;
- providing, in advance, said item with visible indicia; and
- comparing said visible indicia with said secret, non-duplicable information stored in said tag designating authenticity, wherein said item includes a label, and
- wherein said tag is concealed from a user and is attached to a side of said label opposite said user when viewing said label, said label including first and second portions and the tag being attached to one of said first and second portions.

* * * * *